(12) United States Patent
Narendran et al.

(10) Patent No.: US 10,070,480 B1
(45) Date of Patent: Sep. 4, 2018

(54) TEARING DOWN A RADIO LINK BASED ON KEEPALIVE MESSAGE ACTIVITY

(71) Applicant: Sprint Spectrum L.P., Overland Park, KS (US)

(72) Inventors: Rajveen Narendran, Olathe, KS (US); Benjamin Edwin Bittfield, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1133 days.

(21) Appl. No.: 13/868,419

(22) Filed: Apr. 23, 2013

(51) Int. Cl.
*H04W 76/30* (2018.01)
*H04W 76/06* (2009.01)

(52) U.S. Cl.
CPC .......... *H04W 76/30* (2018.02); *H04W 76/06* (2013.01)

(58) Field of Classification Search
CPC ......... H04L 67/00; H04L 67/14; H04L 29/08; H04L 29/08612; H04L 29/08594; H04L 67/143; H04L 67/145
See application file for complete search history.

(56) References Cited

U.S. PATENT DOCUMENTS

| | | | |
|---|---|---|---|
| 6,816,976 B2 | 11/2004 | Wright et al. | |
| 7,395,336 B1 * | 7/2008 | Santharam | H04W 60/06 709/227 |
| 7,573,867 B1 * | 8/2009 | Welch | H04W 76/045 370/352 |
| 7,962,623 B2 | 6/2011 | Undery et al. | |
| 2009/0197589 A1 * | 8/2009 | Kitazoe | H04W 76/045 455/422.1 |
| 2010/0278101 A1 * | 11/2010 | Bengtsson | H04L 29/12471 370/328 |
| 2013/0331091 A1 * | 12/2013 | Chang | H04W 52/0229 455/423 |
| 2014/0269301 A1 * | 9/2014 | Rungta | H04L 47/12 370/235 |

\* cited by examiner

*Primary Examiner* — Dong-Chang Shiue

(57) ABSTRACT

Disclosed herein is a system and method for tearing down a radio link based on keepalive message activity. An example method involves a radio access network (RAN) establishing a radio link with a wireless communication device (WCD); the RAN detecting that the RAN received periodic keepalive messages from the WCD via the radio link; and responsive to the RAN detecting that the RAN received periodic keepalive messages via the radio link, the RAN tearing down the radio link.

20 Claims, 4 Drawing Sheets

TEARING DOWN A RADIO LINK BASED ON KEEPALIVE MESSAGE ACTIVITY

BACKGROUND

Unless otherwise indicated herein, the materials described in this section are not prior art to the claims and are not admitted to be prior art by inclusion in this section.

Wireless communication devices (WCDs), such as cellular phones and tablets have become increasingly popular in recent years. In general, a WCD may be capable of placing a call or accessing the Internet from any place inside a coverage area of a wireless communication network.

A typical wireless communication network includes a number of base stations that radiate to define coverage areas, such as cells and cell sectors, in which WCDs can operate. In turn, each base station may be coupled with a network infrastructure that provides connectivity with one or more transport networks, such as the public switched telephone network (PSTN) and/or the Internet for instance. With this arrangement, a WCD within coverage of the network may engage in air interface communication with a base station and may thereby communicate via the base station with various remote network entities or with other WCDs served by the base station. The combination of network entities that provides a connection between the WCD and the transport network may be considered a radio access network (RAN).

In general, the base station may include an antenna tower and associated radio equipment for engaging in wireless communication with a WCD over an air interface. To facilitate such communication, the base station may assign an air interface traffic channel resource (e.g., a dedicated traffic channel or a radio link identifier) to the WCD, thereby establishing a "radio link" with the WCD. In operation, the base station dynamically assigns traffic channel resources, and therefore dynamically establishes radio links, on an as-needed basis.

OVERVIEW

Once established, a radio link between a base station and a WCD may exist until the radio link is unused for a threshold period, in which case the base station may tear down the radio link. This may involve the base station releasing the assigned traffic channel resource such that the base station may assign it to another WCD. While the radio link exists, the WCD may be considered "active" or "connected." Once the radio link is torn down, the WCD may be considered "dormant" or "idle" at least until a new radio link is established. For this reason, the threshold period is commonly referred to as an active-to-dormant period. The active-to-dormant period may be in a range from five to thirty seconds and may vary to suit a particular wireless communication network.

By way of example, if a radio link between a base station and a WCD has an active-to-dormant period of ten seconds, and neither the base station nor the WCD uses the assigned radio link for ten seconds, the base station may tear down the radio link. As a result, the WCD may change from being active to being dormant. The WCD may then change back to being active upon the base station reestablishing a radio link with the WCD. Notably however, the process of a base station establishing a radio link with a WCD takes time, perhaps in the range of a few milliseconds to a few seconds.

In some instances, a WCD that has no genuine need to communicate with a base station may nonetheless engage in "token" communication with the base station merely to avoid becoming dormant. In particular, the WCD may send periodic keepalive messages to the base station at a sufficiently fast enough rate such that the radio link does not go unused for the active-to-dormant period, and such that the base station does not tear down the radio link. By preserving the radio link in this manner, the WCD may remain active and thereby avoid the need to reestablish a radio link as discussed above.

However, by preserving the radio link in this manner, the WCD may also cause the base station to waste traffic channel resources for the WCD that has no genuine need to communicate with the base station. This may be particularly problematic because a given base station may have a limited supply of traffic channel resources. As such, if too many WCDs cause a base station to preserve radio links in this manner, the base station may run out of available traffic channel resources, and therefore be unable to establish radio links with other WCDs, including perhaps WCDs that have a genuine need to communicate with the base station.

Disclosed herein is a system and corresponding method to help address this problem. In one example method, a RAN establishes a radio link with a WCD. Then, the RAN detects that the RAN received periodic keepalive messages from the WCD via the radio link, and in response to making that detection, the RAN tears down the radio link. This may help preserve traffic channel resources by reducing or eliminating the WCD's ability to remain active despite it not having a genuine need to communicate with the RAN. Even in an instance where the RAN tears down the radio link and then reestablishes it soon thereafter (e.g., in response to the WCD sending its next keepalive message to the RAN), the RAN may still preserve traffic channel resources during that interim period when no radio link exists. This may increase the likelihood that the RAN may be able to establish a radio link with another WCD, such as one that has a genuine need to communicate with the RAN. There may also be other ancillary benefits as well.

DETAILED DESCRIPTION

Throughout this disclosure, any reference to "a" or "an" refers to "at least one" and any reference to "the" refers to "the at least one" unless otherwise specified and/or unless the particular context clearly dictates otherwise.

The systems and methods described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and as a combination of hardware, firmware and/or software.

1. Example Systems and Apparatus

A. First Example Communication System

Figure 1:
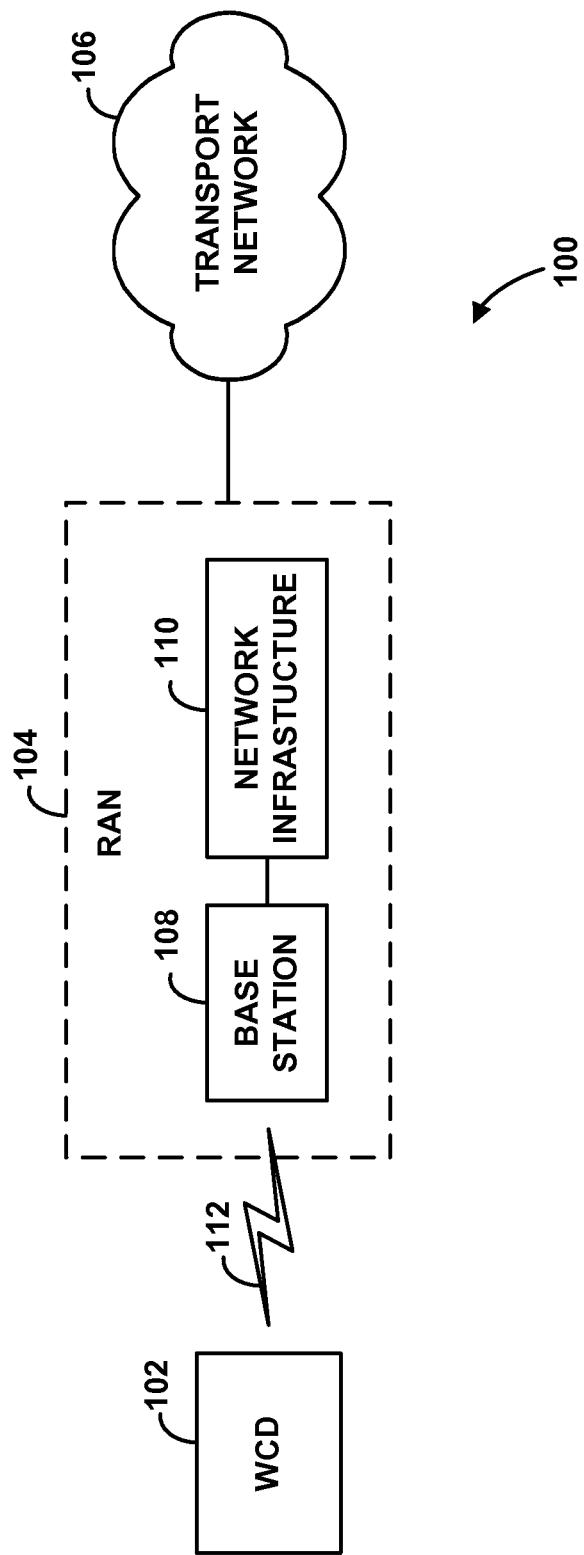
FIG. 1 is a simplified block diagram of a communication system arranged to implement functions in accordance with the disclosed method.

Referring to the drawings, as noted above, FIG. 1 is a simplified block diagram of an example communication system 100 arranged to implement functions in accordance with the disclosed method. As shown, the system 100 includes a WCD 102, a RAN 104, and a transport network 106. Generally, the RAN 104 may be configured to connect the WCD 102 to the transport network 106.

The WCD 102 may take any of a variety of forms, including for example a cellular phone, tablet, laptop, media player, gaming device, or telemetry device. The WCD 102 may be a standalone device or the WCD 102 may be embedded in another device.

The RAN 104 provides wireless connectivity to the transport network 106 and may also take any of a variety of forms. By way of example, the RAN 104 may include a base station 108 and a supporting network infrastructure 110. The WCD 102 may connect with the base station 108 over an air interface 112. And the base station 108 may couple with the network infrastructure 110, which may in turn couple with the transport network 106. Further, the base station 108 or the network infrastructure 110 may include a base station controller (BSC) (not shown) that causes the base station to perform one or more functions.

The transport network 106 may also take a variety of forms. For example, the transport network may be the PSTN or a packet-switched network such as the Internet.

In general, the system 100 may operate in accordance with a particular air interface protocol or "radio access technology," with communications from the base station 108 to WCD 102 defining a downlink or forward link and communications from the WCD 102 to the base station 108 defining an uplink or reverse link. Examples of existing air interface protocols include, without limitation, Code Division Multiple Access (CDMA) (e.g., 1×RTT and 1×EV-DO), Long Term Evolution (LTE), WiMAX, iDEN, TDMA, AMPS, Global System for Mobile Communications (GSM), GPRS, UMTS, EDGE, MMDS, WI-FI, and BLUETOOTH. Each protocol may define its own procedures for registration of WCDs, initiation of communications, handoff between coverage areas, and other functions related to air interface communication.

In order for the RAN 104 to connect the WCD 102 to the transport network 106, the base station 108 establishes a radio link with the WCD over the air interface 112. The process of establishing a radio link can take various forms depending on the protocol used for communication. By way of example, the WCD 102 may request a radio link by sending a radio link request message over the air interface 112 to the base station 108. The base station 108 may then detect that the message is a radio link request message, and the base station may responsively assign to the WCD 102 a traffic channel resource that facilitates air interface communication of bearer traffic between the base station and the WCD. As one example, a traffic channel resource may be a dedicated traffic channel, such as one encoded with a particular pseudo-random number offset (PN offset) and/or a particular Walsh code, for instance. As another example, a traffic channel resource may be a particular radio link identifier that uniquely identifies the radio link and that the RAN 104 may use as a basis to schedule transmissions to and/or from the WCD 102. The base station 108 may maintain data (e.g., in the form of a table) indicating which traffic channel resources are assigned to which WCDs, and indicating which traffic channel resources are available to be assigned.

As noted above, a base station may tear down a radio link if the radio link is not used for a threshold active-to-dormant period. For example, if a threshold active-to-dormant period of a radio link is ten seconds, and no data is communicated to or from the base station 108 using the radio link, the base station 108 may tear down the radio link. This may involve the base station releasing the assigned traffic channel resource from assignment to the WCD. When this occurs, the base station 108 may update the data to indicate that the released traffic channel resource is now available to be assigned to another WCD.

B. Second Example Communication System

Figure 2:
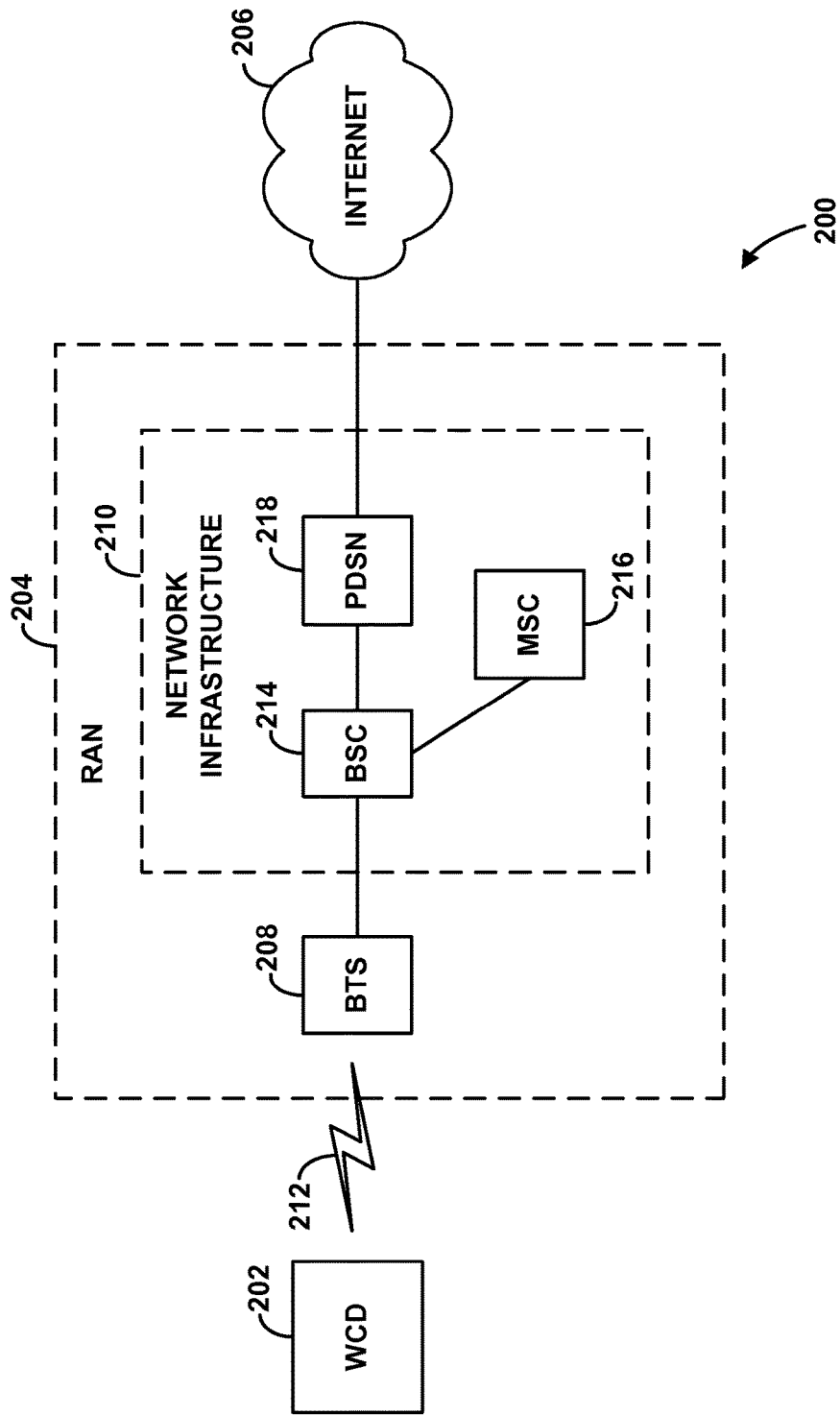
FIG. 2 is a simplified block diagram of another communication system arranged to implement functions in accordance with the disclosed method.

FIG. 2 is next a simplified block diagram of a second communication system arranged to implement functions in accordance with the disclosed method. The system 200 is one particular example of the system 100, and may include a WCD 202, a RAN 204, and the Internet 206. Generally, the RAN 204 may be configured to connect the WCD 202 to the Internet 206.

By way of example, the RAN 204 may include a base station known as a base transceiver station (BTS) 208 and a supporting network infrastructure 210. The WCD 202 may connect to the BTS 208 over an air interface 212. And the BTS 208 may couple with the network infrastructure 210, which may in turn couple with the Internet 206.

In this example, the network infrastructure 210 may include a BSC 214, a mobile switching center (MSC) 216, and a packet data serving node (PDSN) 218. The BTS 208 may be coupled with the BSC 214, which may in turn be coupled with the MSC 214 and with the PDSN 218, and the PDSN 218 may then be coupled with the Internet 206.

In order for the WCD 202 to engage in packet-data communication on the Internet 206, the WCD may need a radio link with the BTS 208, a data link with the PDSN 218, and an assigned IP address. The process of establishing these links and assigning an IP address can take various forms depending on the protocol used for communication.

By way of example, under the well-known "cdma2000" family of standards, the WCD 202 may request a packet-data connection by sending a packet-data origination request message over the air interface 212, and via the BTS 208 and the BSC 214, to the MSC 216. The MSC 216 may then responsively detect that the message is a request for packet-data connectivity and therefore send the message back to the BSC 214 for handling. In turn, when the BSC 214 receives the request from the MSC 216, the BSC may assign a particular traffic channel resource such as a dedicated traffic channel to the WCD, thereby causing the BTS 208 to establish a radio link with the WCD 202 over the air interface 212. The BTS 208 and the WCD 202 may then communicate over this radio link.

The BSC 214 may also pass the request to the PDSN 218, which in turn may establish a data link with the WCD 202, typically a point-to-point protocol (PPP) session. Similar to with the radio link, the PDSN 218 may establish a data link with the WCD by assigning a session resource to the WCD 202. Likewise, the PDSN 218 may release the assigned session resource, thereby tearing down the data link.

The PDSN 218 may further facilitate assignment of an IP address (defining a network layer connection) to the WCD 202. For instance, the PDSN 218 may apply a Dynamic Host Control Protocol (DHCP) function to select and assign to the WCD an IP address routable on the Internet 206. Alternatively, the PDSN 218 may function as a Mobile-IP foreign agent, and the WCD 202 may transmit to the WCD a Mobile-IP registration request (RRQ) message, which the PDSN may forward to a Mobile-IP home agent on the Internet 206. The Mobile-IP home agent may then select and assign to the WCD 202 an IP address routable on the Internet and establish a binding between that address and a care-of address of the PDSN 218, and may transmit to the WCD a Mobile-IP registration reply (RRP) message, providing an indication of the assigned IP address.

Once the WCD 202 has a radio link with the BTS 208, a data link with the PDSN 218, and an assigned IP address, the WCD may then engage in packet-data communication on the Internet 206. In particular, the WCD 202 may generate outgoing packets specifying the WCD's assigned IP address as a source address and specifying a desired destination address, and carrying bearer traffic as payload, the WCD may transmit those packets over the data link, via the radio link, to the PDSN 218. The PDSN 218 may then route the packets on the Internet 206 for transmission to their destination. Further, as the PDSN 218 receives packets destined to the IP address of the WCD 202, the PDSN may transmit those packets over the data link, via the radio link to the WCD.

As noted above, a base station (or perhaps another entity in the RAN) may tear down a radio link after the radio link has been unused for a threshold active-to-dormant period. For instance, assuming that a radio link has a ten second active-to-dormant period, after ten seconds in which no packet-data is communicated to or from the BTS 208 using the radio link, the BTS 208 may release the traffic channel resource that it had assigned to the WCD 202, thereby tearing down the radio link and causing the WCD to become dormant. However, despite the WCD 202 being dormant, the WCD 202 may retain its data link with the BTS 208 and its assigned IP address.

When the dormant WCD 202 seeks to transmit packet-data from its assigned network address, the WCD will reestablish a radio link with the BTS 208 over which they may engage in communication. To do so, for instance, the WCD 202 may transmit a link request message to the BTS 208, and as discussed above, the BTS may assign to the WCD a dedicated traffic channel for carrying bearer traffic between the WCD and the BTS. The WCD may then transmit the packet-data over the data link, via the newly established radio link, to the PDSN 218 for transmission to its destination.

Likewise, if the PDSN 218 receives packet-data destined for a dormant WCD 202, the base station will similarly reestablish a radio link with the WCD over which the WCD may receive the packet-data. This may involve the PDSN 218 causing a paging controller such as the MSC 216 to send a page message to the WCD, and the WCD then transmitting a link request message to the BTS 208 as discussed above so as to establish a radio link with the BTS 208. The PDSN 218 may then transmit the packet-data over the data link, via the newly established radio link, to the WCD 202.

C. Example Apparatus

Figure 3:
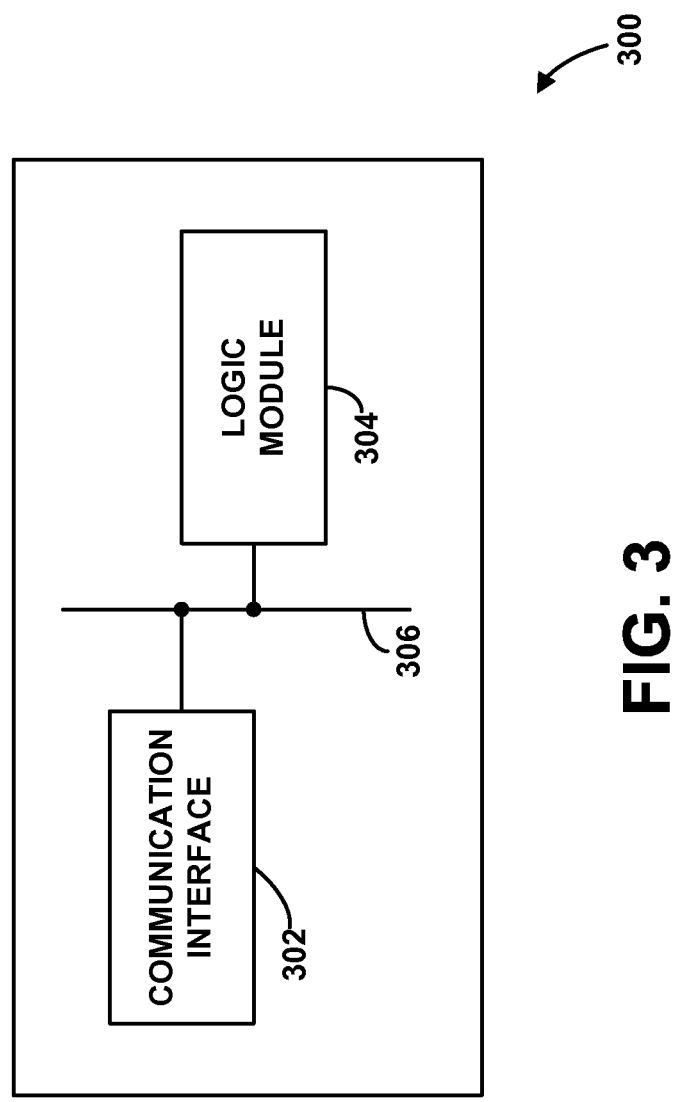
FIG. 3 is a simplified block diagram depicting example components of an apparatus arranged to implement functions in accordance with the disclosed method.

FIG. 3 is a simplified block diagram depicting example components of an apparatus 300 arranged to implement functions in accordance with the disclosed method. The apparatus 300 may take the form of one or more of the entities included in the RANs 104, 204 described above. For example, the apparatus 300 may take the form of the base station 108 or a combination of the BTS 208 and the BSC 214.

As shown, the apparatus 300 may include a communication interface 302 and a logic module 304, both of which may be coupled together by a system bus, network, or other connection mechanism 306. The communication interface 302 may take a variety of forms and may be configured to communicate with one or more entities according to any number of protocols. Likewise, the logic module 304 may take a variety of forms. For example, the logic module 304 may take the form of a processor and a data storage. The processor may include one or more general-purpose processors (e.g., microprocessors) and/or special-purpose processors (e.g., digital signal processors and/or application specific integrated circuits) and may be integrated in whole or in part with the communication interface 302.

The data storage may include one or more volatile and/or non-volatile storage components and may be integrated in whole or in part with the processor. In one example, the data storage may take the form of a non-transitory computer-readable medium and may contain program instructions, that when executed by the processor, cause the apparatus 300 or another entity to perform one or more of the functions described herein.

2. Example Method

Figure 4:
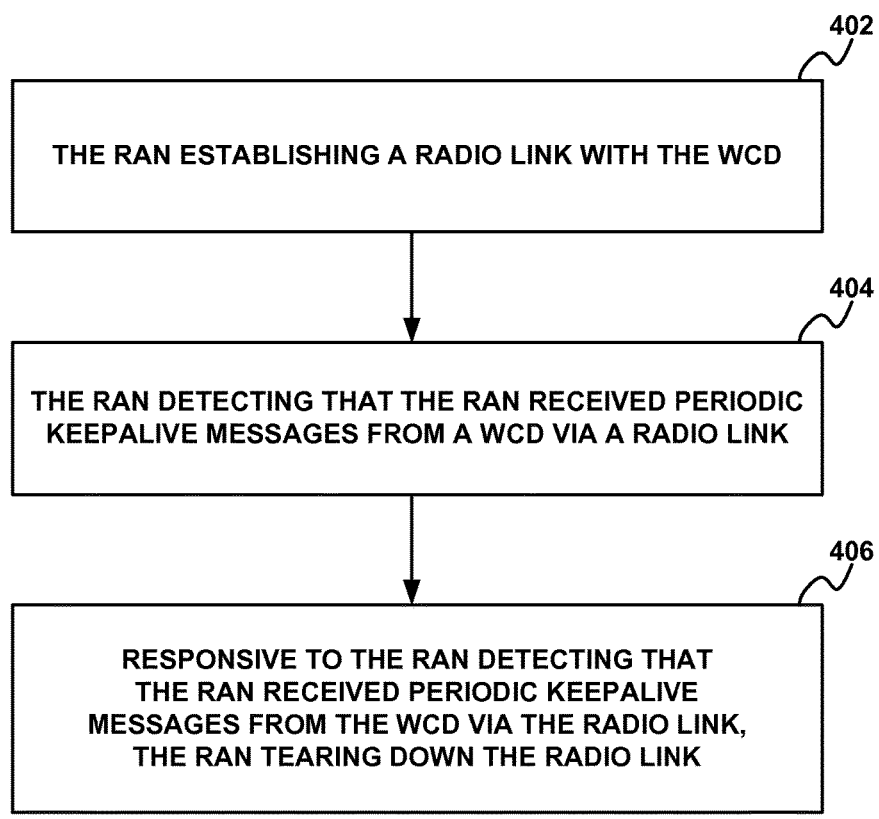
FIG. 4 is a flow chart depicting example functions that can be carried out in accordance with the disclosed method.

FIG. 4 is a flow chart depicting example functions in accordance with the disclosed method. These functions are described as being performed by the RAN 104, meaning they can be performed by any entity within the RAN 104 (e.g., the base station 108 or an entity within the network infrastructure 110).

At block 402, the method involves the RAN 104 establishing a radio link with the WCD 102. At block 404, the method then involves the RAN 104 detecting that it received periodic keepalive messages from the WCD 102 via the radio link over the air interface 112. In one example, the RAN 104 may make this detection by detecting that it received periodic messages from the WCD 102 via the radio link, and by detecting that these periodic messages were keepalive messages.

The RAN 104 may detect that it received periodic messages from the WCD 102 via the radio link in a variety of ways. For example, the RAN 104 may detect this by recording the times at which the RAN received messages from the WCD and determining that a threshold number of pairs of sequentially recorded times are separated by approximately the same period.

The RAN 104 may also detect that the periodic messages were keepalive messages in a variety of ways, including for example by analyzing the periodic messages to detect whether they have certain keepalive message properties. Several such properties are described below, together functions that a RAN 104 may perform to detect those properties.

First, a keepalive message may be relatively short as compared to a non-keepalive message (referred to herein as a "genuine message"). This is because a WCD may send a keepalive message not to communicate substantive content, but merely to prevent the radio link from being torn down. As such, the RAN 104 detecting that the periodic messages were keepalive messages may involve the RAN detecting that the periodic messages were each less than a threshold size. As one specific example, the threshold size may be thirty-two bytes.

Second, a keepalive message may include certain data-related characteristics. For instance, a keepalive message may take the form of a "ping" message such as an "echo ping" message according to the Internet Control Message Protocol (ICMP). As such, the RAN 104 detecting that the periodic messages were keepalive messages may involve the RAN detecting that the periodic messages each included data having a predefined characteristic. Such a characteristic may be that the message's header has an echo ping code or perhaps that the message lacks a payload portion. As another example, the characteristic may be that the message has a payload portion that is all zeros. In this instance, the RAN 104 may conduct "deep inspection" of the message to detect whether it had such a characteristic.

Third, keepalive messages sent from a given WCD may be similar, if not identical to each other. This is because a WCD may send periodic keepalive messages by repeatedly sending the same keepalive message. As such, the RAN 104 detecting that the periodic messages were keepalive messages may involve the RAN detecting that the periodic messages each had a threshold extent of similarity with each other. In one example, this may involve the RAN 104 detecting that the periodic messages each had the same data as each other. As with the example above, this may involve the RAN inspecting the header and/or payload portions of the respective messages to compare the respective data.

The RAN 104 may also detect that the periodic messages were keepalive messages by analyzing the manner in which the RAN received the periodic messages (which may indicate the manner in which the WCD sent the periodic messages). As discussed above, the WCD 102 may send periodic keepalive message to preserve a radio link. To accomplish this goal, the WCD 202 must send periodic keepalive messages at greater than a threshold rate (i.e., to prevent the radio link from going unused for the active-to-dormant period of the radio link). As such, the RAN 104 detecting that the periodic messages were keepalive messages may involve the RAN detecting that it received the periodic messages at greater than a threshold rate. This may involve the RAN 104 detecting that a period between each received pair of sequential periodic messages is less than an active-to-dormant period of the radio link. In one specific example, where the active-to-dormant period is ten seconds, the period between each pair of sequential periodic messages may be in a range of three seconds to nine seconds.

To preserve a radio link for an extended period, a WCD may also continue to send periodic keepalive messages for an extended period. As such, the RAN 104 detecting that the periodic messages were keepalive messages may involve the RAN detecting that the RAN received the periodic messages for at least a threshold period. In one specific example, the threshold period may be sixty seconds. Further, detecting that the RAN 104 received keepalive message for a threshold period could involve detecting that the RAN received a threshold number of keepalive messages.

At block 406, the method involves responsive to the RAN 106 detecting that the RAN received periodic keepalive messages via the radio link, the RAN tearing down the radio link. As a result, the WCD 102 may change from being active to being dormant, at least until the RAN 104 reestablishes a radio link with the WCD 102 as described above. As discussed above, this may help preserve traffic channel resources by reducing or eliminating the WCD's ability to remain active despite it not having a genuine need to communicate with the RAN.

3. Conclusion

While certain examples have been provided above, those skilled in the art will understand that changes and modifications may be made to these examples without departing from the true scope and spirit of the present invention, which is defined by the claims.

What is claimed is:

1. A method comprising:
   detecting that a radio access network (RAN) received periodic keepalive messages from a wireless communication device (WCD) via a radio link; and
   responsive to detecting that the RAN received periodic keepalive messages from the WCD via the radio link, tearing down the radio link.

2. The method of claim 1, wherein detecting that the RAN received periodic keepalive messages from the WCD via the radio link comprises: (i) detecting that the RAN received periodic messages from the WCD via the radio link; and (ii) detecting that the periodic messages were keepalive messages.

3. The method of claim 2, wherein detecting that the periodic messages were keepalive messages comprises detecting that the periodic messages were each less than a threshold size.

4. The method of claim 2, wherein detecting that the periodic messages were keepalive messages comprises detecting that the periodic messages each included data having a predefined characteristic.

5. The method of claim 2, wherein detecting that the periodic messages were keepalive messages comprises detecting that the RAN received at greater than a threshold rate the periodic messages via the radio link.

6. The method of claim 5, wherein detecting that the RAN received at greater than the threshold rate the periodic messages via the radio link comprises detecting that a period between each pair of sequential periodic messages is less than an active-to-dormant period of the radio link.

7. The method of claim 5, wherein detecting that the WCD sent at greater than the threshold rate the periodic messages via the radio link comprises detecting that a period between each pair of sequential periodic messages is in a range of three seconds to nine seconds.

8. The method of claim 2, wherein detecting that the periodic messages were keepalive messages comprises detecting that the RAN received for greater than a threshold period the periodic messages via the radio link.

9. The method of claim 2, wherein detecting that the periodic messages were keepalive messages comprises detecting that the periodic messages each had a threshold extent of similarity with each other.

10. The method of claim 9, wherein detecting that the periodic messages each had the threshold extent of similarity with each other comprises detecting that the periodic messages each had the same data as each other.

11. The method of claim 1, wherein detecting that the RAN received periodic keepalive messages via the radio link comprises the RAN detecting that the RAN received periodic keepalive messages via the radio link, and wherein tearing down the radio link comprises the RAN tearing down the radio link.

12. A method comprising:
   a radio access network (RAN) establishing a radio link with a wireless communication device (WCD);
   the RAN detecting that the RAN received periodic keepalive messages from the WCD via the radio link; and
   directly responsive to the RAN detecting that the RAN received periodic keepalive messages via the radio link, the RAN tearing down the radio link.

13. The method of claim 12, wherein the RAN detecting that the RAN received periodic keepalive messages via the radio link comprises: (i) the RAN detecting that the RAN received periodic messages from the WCD via the radio link; and (ii) the RAN detecting that the periodic messages were keepalive messages.

14. The method of claim 13, wherein the RAN detecting that the periodic messages were keepalive messages comprises the RAN detecting that the periodic messages were each less than a threshold size.

15. The method of claim 13, wherein the RAN detecting that the periodic messages were keepalive messages comprises the RAN detecting that the periodic messages each included data having a predefined characteristic.

16. The method of claim 13, wherein the RAN detecting that the periodic messages were keepalive messages comprises the RAN detecting that the RAN received at greater than a threshold rate the periodic messages via the radio link.

17. The method of claim 13, wherein the RAN detecting that the periodic messages were keepalive messages comprises the RAN detecting that the RAN received for greater than a threshold period the periodic messages via the radio link.

18. The method of claim 13, wherein the RAN detecting that the periodic messages were keepalive messages comprises the RAN detecting that the periodic messages each had a threshold extent of similarity with each other.

19. A radio access network (RAN) comprising:
- a base station configured to communicate with a wireless communication device (WCD) via a radio link; and
- a logic module, wherein the logic module is configured to cause performance of a set of functions comprising:
  - (i) detecting that the RAN received periodic keepalive messages from the WCD via a radio link; and
  - (ii) responsive to detecting that the RAN received periodic keepalive messages from the WCD via the radio link, tearing down the radio link.

20. The RAN of claim 19, wherein detecting that the RAN received periodic keepalive messages from the WCD via the radio link comprises: (i) detecting that the RAN received periodic messages from the WCD via the radio link; and (ii) detecting that the periodic messages were keepalive messages.

* * * * *